United States Patent
Shiraishi et al.

(10) Patent No.: US 8,986,565 B2
(45) Date of Patent: Mar. 24, 2015

(54) HEAT-RAY SHIELDING COMPOSITION AND METHOD FOR PRODUCING THE SAME

(75) Inventors: Shinya Shiraishi, Akita (JP); Megumi Narumi, Kamisu (JP)

(73) Assignees: Mitsubishi Materials Corporation, Tokyo (JP); Mitsubishi Materials Electronic Chemicals Co., Ltd., Akita-shi (JP)

( * ) Notice: Subject to any disclaimer, the term of this patent is extended or adjusted under 35 U.S.C. 154(b) by 401 days.

(21) Appl. No.: 13/504,185

(22) PCT Filed: Oct. 28, 2010

(86) PCT No.: PCT/JP2010/069194
§ 371 (c)(1),
(2), (4) Date: Apr. 26, 2012

(87) PCT Pub. No.: WO2011/052689
PCT Pub. Date: May 5, 2011

(65) Prior Publication Data
US 2012/0211692 A1 Aug. 23, 2012

(30) Foreign Application Priority Data

Oct. 29, 2009 (JP) ................................ 2009-248627
Jul. 29, 2010 (JP) ................................ 2010-171192

(51) Int. Cl.
*C01G 19/00* (2006.01)
*C01G 15/00* (2006.01)
*C09D 5/00* (2006.01)
*C09D 5/18* (2006.01)
*C09D 7/12* (2006.01)
*C08K 3/22* (2006.01)

(52) U.S. Cl.
CPC *C01G 19/00* (2013.01); *C09D 5/18* (2013.01); *C09D 7/1216* (2013.01); *C01P 2002/72* (2013.01); *C01P 2004/04* (2013.01); *C01P 2006/22* (2013.01); *C01P 2006/32* (2013.01); *C01P 2006/60* (2013.01); *C08K 3/22* (2013.01); *C08K 2003/2231* (2013.01)
USPC ........................................... 252/62; 106/401

(58) Field of Classification Search
CPC ................................ C01G 15/00; C01G 19/00
USPC ............................................ 106/401; 252/62
See application file for complete search history.

(56) References Cited

U.S. PATENT DOCUMENTS

| 6,099,982 | A | * | 8/2000 | Okabe et al. | ........... | 428/697 |
| 6,533,966 | B1 | | 3/2003 | Nonninger et al. | | |
| 7,374,743 | B2 | * | 5/2008 | Katusic et al. | ........... | 423/618 |
| 8,153,098 | B2 | * | 4/2012 | Meyer et al. | ........... | 423/594.9 |

FOREIGN PATENT DOCUMENTS

| CN | 1468856 A | 1/2004 | | |
| DE | 19840527 A1 | * | 3/2000 | ............ C01G 19/02 |
| EP | 0604969 A1 | 7/1994 | | |
| JP | 06-293515 A | 10/1994 | | |
| JP | 08-041441 A | 2/1996 | | |
| JP | 2715859 B2 | 2/1998 | | |
| JP | 2001-261336 A | 9/2001 | | |
| JP | 2003-215328 A | 7/2003 | | |
| JP | 2005-232399 A | 9/2005 | | |
| JP | 2005-322626 A | 11/2005 | | |
| JP | 2007-154152 A | 6/2007 | | |
| JP | 2008-110915 A | 5/2008 | | |
| WO | WO2010/003743 A1 | * | 1/2010 | ............ C01G 15/00 |

OTHER PUBLICATIONS

Machine Translation of Japanese Patent Specification No. JP 08-041441 A (Feb. 1996).*
Machine Translation of Japanese Patent Specification No. JP 2001-261336 A (Sep. 2001).*
Machine Translation of Japanese Patent Specification No. JP 2005-232399 A (May 2008).*
Office Action mailed Jul. 19, 2013, issued for the Chinese patent application No. 201080048388.2 and English translation of the search report.
Hammarberg, E. et al., Microwave-assisted synthesis of indium tin oxide nanocrystals in polyol media and transparent, conductive layers thereof, Thin Solid Films, Elsevier-Sequoia S.A.Lausanne, CH, vol. 516, No. 21, Sep. 1, 2008, pp. 7437-7442.
Office Action mailed Mar. 7, 2014, issued for the European patent application No. 10826821.0.
Kagaku Daijiten (Encyclopedic Dictionary of Chemistry), 1st Edition (Tokyo Kagaku Dozin Co. Ltd.), Oct. 20, 1989, pp. 1169-1170 and partial translation thereof.
International Search Report dated Feb. 8, 2011, issued for PCT/JP2010/069194.
Search Report dated Mar. 1, 2013, issued for the European Patent Application No. 10826821.0.

* cited by examiner

*Primary Examiner* — Anthony J Green
(74) *Attorney, Agent, or Firm* — Locke Lord LLP; James E. Armstrong, IV; Nicholas J. DiCeglie, Jr.

(57) ABSTRACT

Disclosed are a heat-ray shielding composition including an indium tin oxide powder which has a BET specific surface area of 40 m$^2$/g or more and a navy blue or cobalt blue (L=30 or less, a<0, b<0 in the Lab colorimetric system) tone, and preferably a heat-ray shielding composition, wherein the indium tin oxide powder contained in the composition is an indium tin oxide powder which is surface-modified by firing indium tin hydroxide having bright yellow to persimmon (reddish brown or orange-red) tone, or an indium tin oxide powder which is surface-modified by firing indium tin oxide having bright yellow to persimmon (reddish brown or orange-red) tone; and a method for producing the same.

9 Claims, 7 Drawing Sheets

HEAT-RAY SHIELDING COMPOSITION AND METHOD FOR PRODUCING THE SAME

TECHNICAL FIELD

The present invention relates to a heat-ray shielding composition having excellent heat-ray shielding effect, and a method for producing the same, and more particularly to a heat-ray shielding composition having excellent heat-ray shielding effect, which contains a heat-ray shielding material of a co-precipitated indium tin hydroxide having a bright yellow to persimmon (reddish brown or orange-red) tone, or an indium tin hydroxide obtained by surface-modifying an indium tin oxide powder having the above color tone, and a method for producing the same.

This application claims priority on Japanese Patent Application No. 2009-248627 filed on Oct. 29, 2009 in Japan and Japanese Patent Application No. 2010-171192 filed on Jul. 29, 2010 in Japan, the disclosure of which is incorporated by reference herein.

BACKGROUND ART

Indium tin oxide (referred to as ITO) has been known as a heat-ray shielding material. There has hitherto been known, as a method for producing an ITO powder, a method in which an indium-containing aqueous solution is mixed with a tin-containing aqueous solution to co-precipitate indium tin hydroxide, and firing the obtained co-precipitate.

For example, Japanese Unexamined Patent Application, First Publication No. Hei 6-295315 (Patent Literature 1) describes a method for producing an indium tin hydroxide in which indium metal is dissolved in nitric acid and a mixed aqueous solution with an aqueous tin tetrachloride solution ($SnCl_4$) is concentrated while heating. Japanese Patent No. 2,715,859 (Patent Literature 2) describes a production method in which an aqueous indium trichloride solution is mixed with an aqueous tin tetrachloride solution and the obtained mixed solution is added dropwise in an aqueous ammonium hydrogen carbonate solution.

According to the production method of Patent Literature 1, white indium tin hydroxide is obtained. According to the production method of Patent Literature 2, the formed indium tin hydroxide also exhibits a white color. Furthermore, it has been known that indium hydroxide generally exhibits white color and tin hydroxide also exhibits white color (Non Patent Literature 1, etc.).

It has been known that, in case of using an ITO powder as a heat-ray shielding material, the powder preferably has a color tone in which a<0 and b<0, and the ratio [(a·b)/L] of the (a·b) value to the L value is 0.3 or more in the Lab colorimetric system, so as to enhance heat-ray shielding properties (Japanese Unexamined Patent Application, First Publication No. 2007-154152: Patent Literature 3). However, a conventional ITO powder is inferior in heat-ray shielding properties since the above (a·b)/L ratio has a small value.

Japanese Patent Application No. 2005-232399 (Patent Literature 4) discloses an ITO powder whose powder has a color in which L=52 to 90, a=−5 to −0.1, and b=−4 to 30 in the Lab colorimetric system. However, the ITO powder described in Examples thereof has not a yellow-based tone, but has a dull color tone in which a=−5.8 to −4.6 and b=−12 to 4.6. Japanese Patent Application No. 2003-215328 (Patent Literature 5) discloses an ITO powder in which L=52 to 80, a=−10 to −0.1, and b=−14 to 20. However, the ITO powder does not have a yellow-based tone and any production method thereof is not described at all.

Japanese Patent Application No. 2005-322626 (Patent Literature 6) describes an ITO powder whose powder has a color in which L=82 to 91, a=−8 to 2, and b=0 to 10 in the Lab colorimetric system. However, the ITO powder is a white-based powder in which a white needle-shaped indium obtained by concentrating an indium nitrate solution is calcined and pores thereof are impregnated with tin tetrachloride, followed by firing, and also the production method is complicated.

CITATION LIST

Patent Literature

[Patent Literature 1]
Japanese Unexamined Patent Application, First Publication No. Hei 6-293515
[Patent Literature 2]
Japanese Patent No. 2,715,859
[Patent Literature 3]
Japanese Unexamined Patent Application, First Publication No. 2007-154152
[Patent Literature 4]
Japanese Unexamined Patent Application, First Publication No. 2005-232399
[Patent Literature 5]
Japanese Unexamined Patent Application, First Publication No. 2003-215328
[Patent Literature 6]
Japanese Unexamined Patent Application, First Publication No. 2005-322626

Non Patent Literature

[Non Patent Literature 1]
Kagaku Daijiten (Encyclopedic Dictionary of Chemistry), 1st Edition (Tokyo Kagaku Dozin Co., Ltd.), page 1169, page 1170

DISCLOSURE OF INVENTION

Technical Problem

The present invention provides a composition which is excellent in heat-ray shielding effect compared with a conventional heat-ray shielding material. The present invention provides a heat-ray shielding composition having a heat-ray shielding effect enhanced by using, as a heat-ray shielding material, an ITO powder having a bright yellow to persimmon (reddish brown or orange-red) tone, or an ITO powder obtained by surface-modifying a co-precipitated indium tin oxide powder having a similar color tone, in place of a conventional white-based ITO powder.

Solution to Problem

The present invention is directed to a heat-ray shielding composition in which the above-mentioned problems have been solved by the following constitutions.

[1] A heat-ray shielding composition including an indium tin oxide powder (ITO power) which has a BET specific surface area of 40 $m^2/g$ or more and a navy blue or cobalt blue (L=30 or less, a<0, b<0 in the Lab colorimetric system) tone.

[2] The heat-ray shielding composition according to the above [1], wherein, when the dispersion solution having the concentration of 0.7% by weight to 1.2% by weight of the indium tin oxide powder is subjected to the measurement using a cell having an optical path length of 1 mm, the following measurement are obtained: a sunlight transmittance is 60% or less, a visible light transmittance is 85% or more, and a haze is 0.5% or less.

[3] The heat-ray shielding composition according to the above [1] or [2], wherein the indium tin oxide powder contained in the heat-ray shielding composition is an indium tin oxide powder which is surface-modified by firing indium tin hydroxide having a bright yellow to persimmon (reddish brown or orange-red) tone, or an indium tin oxide powder which is surface-modified by firing indium tin oxide having a bright yellow to persimmon (reddish brown or orange-red) tone.

The present invention is also directed to a method for producing a heat-ray shielding composition with the following constitutions.

[4] A method for producing a heat-ray shielding composition, which includes the steps of:
 using an indium compound and a divalent tin compound, and co-precipitating an indium tin hydroxide whose dry powder exhibits bright yellow to persimmon (reddish brown or orange-red) color under the conditions of the pH of 4.0 to 9.3 and a liquid temperature of 5° C. or higher;
 drying and firing the indium tin hydroxide to obtain a surface-modified indium tin oxide powder; and
 dispersing the surface-modified indium tin oxide powder in a solvent, and then mixing the dispersion solution with a resin.

[5] The method for producing a heat-ray shielding composition according to the above [4]; wherein
 the surface modification is performed by heating/firing which is performed simultaneously with or after drying of bright yellow to persimmon (reddish brown or orange-red) indium tin hydroxide under a nitrogen atmosphere, or under an atmosphere of nitrogen containing any one kind selected from the group consisting of steam, alcohol and ammonia; and
 the surface-modified indium tin oxide powder has a navy blue or cobalt blue tone and a BET specific surface area of 40 m$^2$/g or more.

[6] The method for producing a heat-ray shielding composition according to the above [4] or [5], which performs, in the step of obtaining the surface-modified indium tin oxide powder, a surface modification treatment of any one of the following (I), (II) and (III):
(I) a co-precipitate of indium tin hydroxide is dried and fired by heating at 250 to 800° C. for 30 minutes to 6 hours under a nitrogen atmosphere, a nitrogen atmosphere containing an alcohol, or a nitrogen atmosphere containing ammonia;
(II) a co-precipitate of indium tin hydroxide is dried overnight at 100° C. to 200° C. under an air atmosphere, and then fired by heating at 250 to 800° C. for 30 minutes to 6 hours under a nitrogen atmosphere, a nitrogen atmosphere containing an alcohol, or a nitrogen atmosphere containing ammonia; and
(III) a co-precipitate of indium tin hydroxide is dried and fired under an air atmosphere, and then heat-treated at 250 to 800° C. for 30 minutes to 6 hours under a nitrogen atmosphere, a nitrogen atmosphere containing an alcohol, or a nitrogen atmosphere containing ammonia.

Advantageous Effects of Invention

Unlike a conventional white indium tin hydroxide, the heat-ray shielding composition of the present invention contains surface-modified indium tin oxide powder obtained by heat-treating a co-precipitated indium tin hydroxide having a bright yellow to persimmon (reddish brown or orange-red) tone. This surface-modified indium tin oxide powder has high crystallinity. Therefore, when the surface-modified indium tin oxide powder is mixed with a resin to form a film, the obtained film has a high visible light transmittance, excellent transparency and high conductivity, and also a film whitening phenomenon is suppressed. This surface-modified indium tin oxide powder is excellent in heat-ray shielding effect and can form a film having a low sunlight transmittance while maintaining high transparency.

BEST MODE FOR CARRYING OUT THE INVENTION

Figure 1:
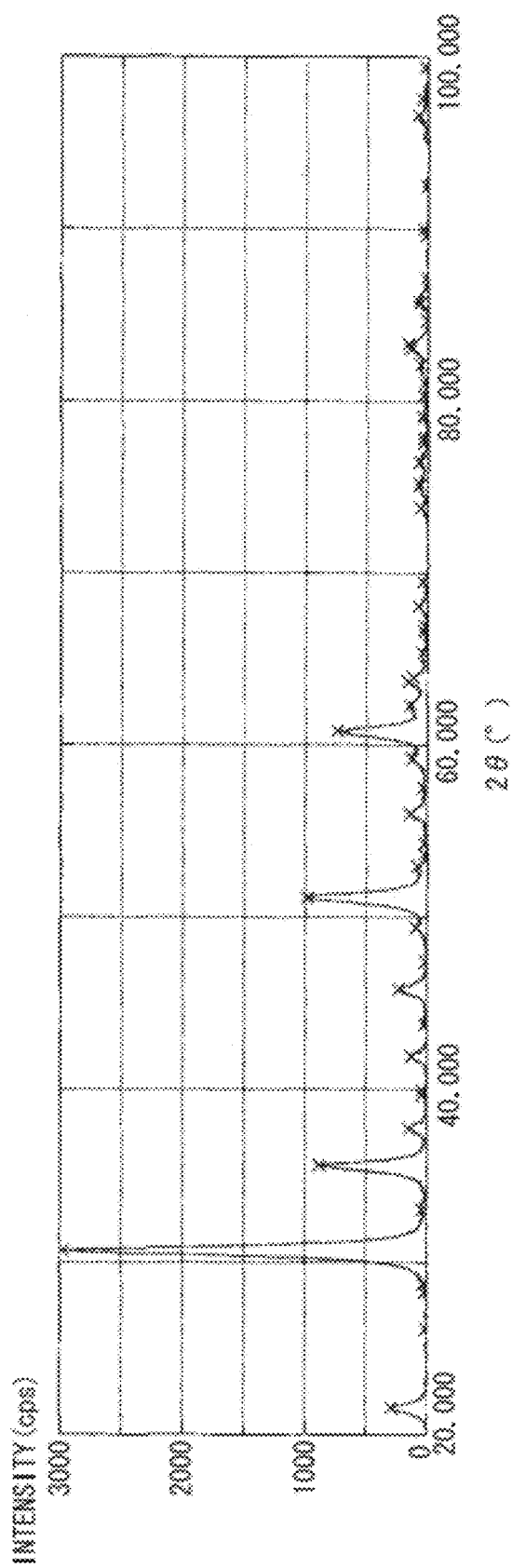
FIG. 1 is a graph showing an X-ray diffraction pattern of an ITO powder of No. 1 in Table 1 after firing in atmospheric air.

An embodiment of the present invention will be specifically described below by way of Examples.

[Heat-Ray Shielding Composition]

The heat-ray shielding composition of the present embodiment is a heat-ray shielding composition including an indium tin oxide powder which has a BET specific surface area of 40 m$^2$/g or more and a navy blue or cobalt blue (L=30 or less, a<0, b<0 in the Lab colorimetric system) tone (hereinafter referred to as a ITO powder).

The heat-ray shielding composition of the present embodiment is preferably a composition having a heat-ray shielding effect in which a sunlight transmittance is 60% or less, a visible light transmittance is 85% or more, and a haze is 0.5% or less, when a dispersion solution containing an ITO powder in a concentration of 0.7% by weight to 1.2% by weight is subjected to the measurement using a cell having an optical path length of 1 mm.

[Production of Heat-Ray Shielding Material]

The ITO powder contained in the heat-ray shielding composition of the present embodiment is preferably an ITO powder in which indium tin hydroxide having a bright yellow to persimmon (reddish brown or orange-red) tone is surface-modified by firing, or ITO having the above color tone is surface-modified, and such an ITO powder can be produced by the following method.

Indium and tin in the solution are precipitated in the presence of an alkali to form a co-precipitated hydroxide of indium and tin. At this time, it is possible to precipitate a co-precipitated hydroxide of indium and tin, whose dry powder has a bright yellow to persimmon (reddish brown or orange-red) tone by adjusting the pH of the solution within a range from 4.0 to 9.3, and preferably from 6.0 to 8.0, and adjusting a liquid temperature within a range of 5° C. or higher, preferably from 10° C. to 80° C., and more preferably from 10° C. to 60° C. using a divalent tin compound ($SnCl_2 \cdot 2H_2O$, etc.). There is no particular limitation on the reaction time, and the reaction time may be from about 10 minutes to 240 minutes. The obtained hydroxide having a bright yellow to persimmon (reddish brown or orange-red) tone is excellent in crystallinity compared with a conventional white indium tin hydroxide. Indium trichloride ($InCl_3$) can be used as indium.

When a tetravalent tin compound ($SnCl_4$, etc.) is used, a white precipitate is formed and a precipitate having a bright yellow to persimmon (reddish brown or orange-red) tone is not formed. When the pH is lower than 4.0 (acidic side) or higher than 9.3 (alkali side), a pale yellowish white precipitate is formed and a precipitate having a bright yellow to persimmon (reddish brown or orange-red) tone is not formed. Any of a white precipitate by a tetravalent tin compound and the above-mentioned yellowish-white precipitate has low crystallinity compared with a precipitate having a bright yellow to persimmon (reddish brown or orange-red) tone and it is impossible to obtain an ITO powder having high crystallinity like the present embodiment even when these precipitates are fired. Since tin tetrachloride is used in the production method of Patent Literature 1, a white indium tin hydroxide precipitate is formed and a precipitate having a bright yellow to persimmon (reddish brown or orange-red) tone is not formed.

In order to adjust the hydrogen-ion exponent (pH) within a range from 4.0 to 9.3 upon reaction, for example, the pH may be adjusted within the above range by using a mixed aqueous solution of indium trichloride ($InCl_3$) and tin dichloride ($SnCl_2 \cdot 2H_2O$) and simultaneously adding dropwise the mixed aqueous solution and an aqueous alkali solution. Alternatively, the above mixed solution is added dropwise in an aqueous alkali solution. As the aqueous alkali solution, ammonia water [$NH_3$ water], ammonium hydrogen carbonate water [$NH_4HCO_3$ water] and the like may be used.

There is no particular limitation on the mixed aqueous solution, it is possible to use an aqueous solution containing 0.01 to 5 mol/L of an indium compound and Sn in the proportion of 1 to 20 mol % in terms of a molar ratio of Sn/(In+Sn) of a tin compound.

Specifically, as shown in Examples 1 to 2 (Nos. 1 to 3), a precipitate whose dry powder has a bright yellow to persimmon (reddish brown or orange-red) tone is formed at pH 7 of the solution and a liquid temperature of 10° C. to 60° C. using tin dichloride. On the other hand, as shown in Comparative Example 1 (No. 7), a pale yellowish white precipitate is formed at pH of lower than 4.0 (pH 3.0) and, as shown in Comparative Example 2 (No. 8), a pale yellowish white precipitate is similarly formed at pH of 9.3 or higher (pH 9.5). Therefore, in order to form a co-precipitated indium tin hydroxide having a bright yellow to persimmon (reddish brown or orange-red) tone, the pH is suitably within a range of from 4.0 to 9.3. The pH becomes closer to neutral, a persimmon (reddish brown or orange-red) color may develop. Furthermore, when tin tetrachloride ($SnCl_4$) is used as shown in Comparative Example 3 (No. 9), a white precipitate is formed and a precipitate, which has a bright yellow to persimmon (reddish brown or orange-red) tone and also high crystallinity is not formed.

After formation of the above-mentioned co-precipitated indium tin hydroxide, the co-precipitate is washed with pure water, washed until resistivity of the supernatant liquid becomes 5,000 $\Omega \cdot cm$ or more, and preferably 50,000 $\Omega \cdot cm$ or more, and then the above-mentioned co-precipitate is subjected to solid-phase separation and the above co-precipitate is recovered. When the resistivity of the supernatant liquid is less than 5,000 $\Omega \cdot cm$, impurities such as chlorine are not sufficiently removed and thus a high-purity indium tin oxide powder cannot be obtained.

The dry powder of the above-mentioned indium tin hydroxide has a bright yellow to persimmon (reddish brown or orange-red) tone and L=80 or less, a=−10 to +10, b=+26 or more in the Lab colorimetric system. For example, in Examples 1 to 6 (No. 1 to No. 6), L=60.3 to 75.1, a=−2.3 to +4.2, and b=+21.9 to +32.2. By the way, precipitates of Comparative Examples 1 to 3 (No. 7 to 9) are white-based precipitates in which L=91 to 100.

An ITO powder (In—Sn oxide powder) can be obtained by drying and firing the above-mentioned indium tin hydroxide. In the step of from drying to firing, for example, the indium tin hydroxide may be dried by heating at 100 to 200° C. for 2 to 24 hours in atmospheric air and then fired by heating at 250° C. or higher, and preferably 400° C. to 800° C. for 1 to 6 hours. The hydroxide remains as it is at 250° C. or lower and is not converted into an oxide. Indium tin hydroxide is oxidized by this firing treatment, and thus an indium tin oxide powder having a bright yellow to persimmon (reddish brown or orange-red) tone can be obtained.

The above-mentioned ITO powder subjected to firing treatment in atmospheric air has a bright yellow to persimmon (reddish brown or orange-red) tone. Specifically, L=80 or less, a=−10 to +10, and b=+26 or more in the Lab colorimetric system. For example, in Examples 1 to 6 (No. 1 to No. 6), L=56.6 to 67.1, a=−1.2 to +2.1, and b=+29.5 to +31.5. On the other hand, a white-based indium tin hydroxide is fired in atmospheric air to form an olive-green powder in which a value is −5 or less in the Lab colorimetric system, as shown in Comparative Example.

The above-mentioned ITO powder is a fine powder having a specific surface area of 55 $m^2/g$ or more, and preferably 60 $m^2/g$ or more. Specifically, ITO powders of Examples 1 to 5 have the BET specific surface area of 60 $m^2/g$ to 85 $m^2/g$, while ITO powders of Comparative Examples 1 to 3 have a BET specific surface area of 45 $m^2/g$ to 48 $m^2/g$, and thus of Examples 1 to 5 are fine powders having noticeably larger specific area compared with Comparative Examples 1 to 3.

Figure 2:
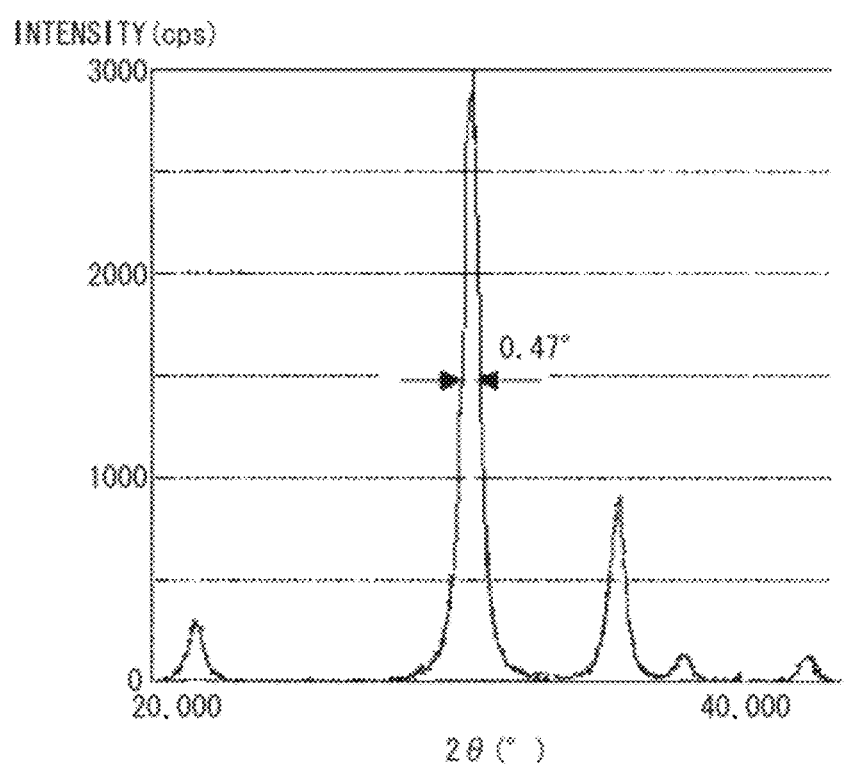
FIG. 2 is a partially enlarged view of FIG. 1.
Figure 4:
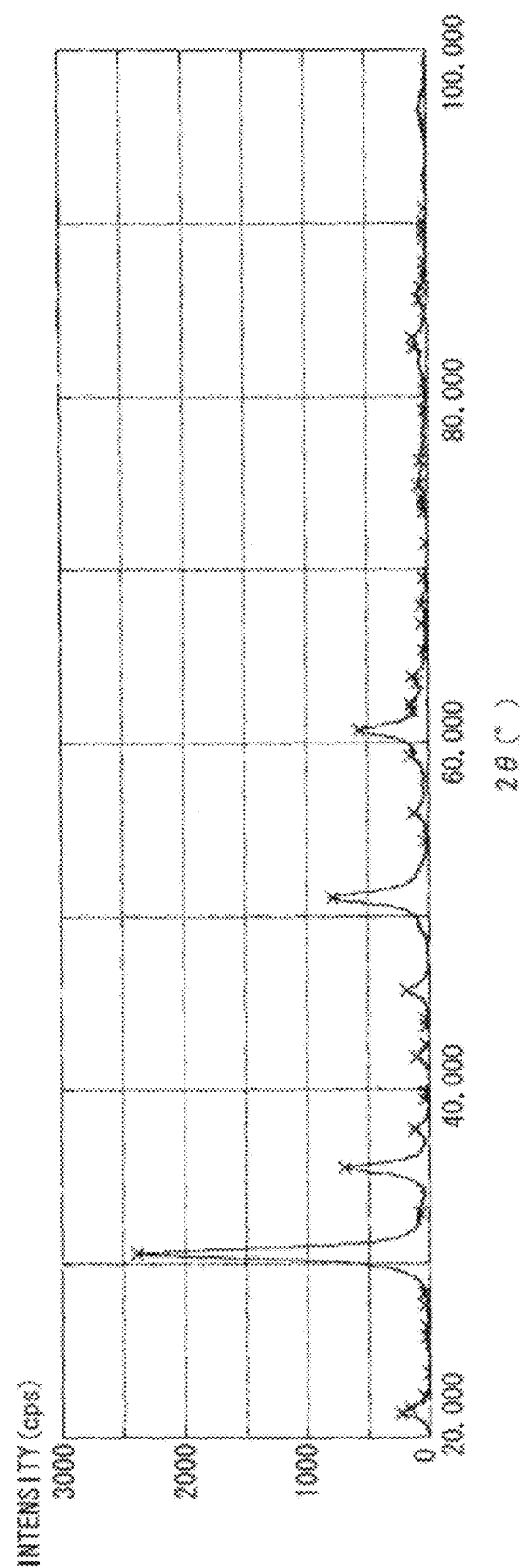
FIG. 4 is a graph showing an X-ray diffraction pattern of an ITO powder of No. 9 in Table 1 after firing in atmospheric air.

The ITO powder having a bright yellow to persimmon (reddish brown or orange-red) tone has high crystallinity. For example, in case of an ITO powder No. 1 of Example A, as shown in FIG. 1 and FIG. 2, a peak of the (222) plane in an X-ray diffraction chart has a large relative intensity (about 3,000 cps) and a half value width thereof is less than 0.6° (specifically, 0.47°). On the other hand, an ITO powder No. 9 of Comparative Example A is obtained by firing a white indium tin hydroxide and has an olive-green color. As shown in FIG. 4, a peak of the (222) plane in an X-ray diffraction chart has a relative intensity of 2,500 cps or less and a half value width thereof is more than 0.6° (specifically, 0.65°). As mentioned above, the ITO powder used in the present embodiment has a half value width which is considerably less than that of an ITO powder of Comparative Example, and is therefore a powder having a high crystallinity.

In the above-mentioned ITO powder having a bright yellow to persimmon (reddish brown or orange-red) tone, it is preferred that a peak of the (222) plane in an X-ray diffraction chart has a relative intensity of about 2,600 to 4,000 cps and a half value width thereof is about 0.3 to 0.6°

In a drying and firing treatment of the above-mentioned co-precipitated indium tin hydroxide (co-precipitated In—Sn hydroxide) or a drying and firing treatment of the above-mentioned indium tin oxide (In—Sn oxide), the ITO powder can be subjected to a surface modification treatment. The conductivity can be improved and also transparent conductivity effect can be enhanced by the surface treatment.

The surface modification treatment of the following (I), (II) and (III) can be performed at each stage simultaneously with drying, or during or after firing. A surface-modified ITO powder can be obtained by the surface modification treatment of the following (I), (II) and (III):

(I) the above-mentioned indium tin hydroxide is dried and fired by heating at 250 to 800° C. for 30 minutes to 6 hours under a nitrogen atmosphere, a nitrogen atmosphere containing an alcohol, or a nitrogen atmosphere containing ammonia, (II) the above-mentioned indium tin hydroxide is dried overnight at 100° C. to 200° C. under an air atmosphere to obtain a dried indium tin hydroxide. The dried indium tin hydroxide is fired by heating at 250 to 800° C. for 30 minutes to 6 hours under a nitrogen atmosphere, a nitrogen atmosphere containing an alcohol, or a nitrogen atmosphere containing ammonia; and (III) the above-mentioned indium tin hydroxide is dried and fired under an air atmosphere, and then heat-treated at 250 to 800° C. for 30 minutes to 6 hours under a nitrogen atmosphere, a nitrogen atmosphere containing an alcohol, or a nitrogen atmosphere containing ammonia.

In the above-mentioned (III), the above-mentioned indium tin hydroxide may be dried and fired at 250° C. or higher under an air atmosphere to obtain a dried indium tin oxide, and then the obtained indium tin oxide may be heat-treated at 250 to 800° C. for 30 minutes to 6 hours under a nitrogen atmosphere, a nitrogen atmosphere containing an alcohol, or a nitrogen atmosphere containing ammonia.

The nitrogen atmosphere may contain any one kind selected from the group consisting of steam, alcohol and ammonia.

The above-mentioned surface-modified ITO powder has a BET specific surface area of 40 $m^2/g$ or more, preferably 55 $m^2/g$ or more, and more preferably 55 to 80 $m^2/g$, and has a navy blue or cobalt blue color. Specifically, the surface-modified ITO powder has a navy blue or cobalt blue tone in which L=30 or less, a<0, b<0 in the Lab colorimetric system.

Since the surface-modified ITO powder is fine and also has high crystallinity, when a film or a sheet is formed by mixing with a resin, the obtained film or a sheet can be obtained high transparency and excellent conductivity. When the surface-modified ITO powder is used as a heat-ray shielding material, excellent heat-ray shielding effect can be obtained.

In the surface-modified ITO powder, it is preferred that a peak of the (222) plane in an X-ray diffraction chart has a relative intensity of about 2,800 to 5,000 cps, and also has half value width of a peak of about 0.3 to 0.5°.

The heat-ray shielding composition of the present embodiment contains the surface-modified ITO powder.

The heat-ray shielding composition of the present embodiment is produced, for example, by the following method.

The surface-modified ITO powder is dispersed in a dispersion solvent to obtain a dispersion solution. There is no particular limitation on dispersion solvent, and it is possible to use a dispersion solvent composed of one or more kinds selected from the group consisting of distilled water, triethylene glycol-di-2-ethylhexanoate, anhydrous ethanol, phosphoric acid polyester, 2-ethylhexanoic acid, 2,4-pentanedion, toluene, methyl ethyl ketone, methyl isobutyl ketone, cyclohexanone, an acrylic monomer, N-methylpyrrolidone, isopropyl alcohol, ethylene glycol, propylene glycol and butanol.

The dispersion solution is mixed with a resin such as acryl, polyimide, a phenol resin, polyvinyl alcohol or butyral to obtain a heat-ray shielding composition.

There is no particular limitation on the amount of the heat-ray shielding composition in the surface-modified ITO powder. The heat-ray shielding composition is preferably prepared so that the amount of ITO in the heat-ray shielding composition is adjusted within a range from 0.01 to 90% by weight, and more preferably from 0.1 to 85% by weight. The content depends on the film thickness of the heat-ray shielding composition. For example, in case of a compound having a film thickness of 2 μm, when the amount of the surface-modified ITO powder is 1% by weight or more, a composition having excellent heat-ray shielding effect can be provided. On the other hand, when the amount of the ITO powder is 90% by weight or less, the film strength can be maintained. There is also a method in which the film strength is obtained by overcoating on a composition composed of only an ITO powder.

Specifically, in the heat-ray shielding composition of the present embodiment, when the concentration of the ITO powder of 0.7% by weight to 1.2% by weight in the composition is measured using a cell having an optical path length of 1 mm, the composition may be a composition which has high heat-ray shielding effect with a high sunlight transmittance of 60% or less and has high transparency with a visible light transmittance of 85% or more, and is also less hazy with a haze of 0.5% or less.

EXAMPLES

Examples of the present embodiment will be shown below, together with Comparative Examples. X-ray diffraction pattern, specific surface area and color tone (Lab values) of the ITO powder were measured by the following methods.

[X-Ray Diffraction Pattern]

X-ray diffraction pattern was measured using a powder X-ray diffractometer, manufactured by Rigaku Corporation (product name: MiniFlexII).

[BET Specific Surface Area]

BET specific surface area was measured using a high-speed surface area analyzer (SA-1100), manufactured by SIBATA SCIENTIFIC TECHNOLOGY LTD.

[Color Tone]

Lab values were measured using a color computer (SM-T), manufactured by SUGA TEST INSTRUMENTS CO., LTD.

[ITO powder: Sample No. 1]

An aqueous indium chloride ($InCl_3$) solution (containing 18 g of In metal) (50 mL) was mixed with 3.6 g of tin dichloride ($SnCl_2 \cdot 2H_2O$) and the obtained mixed aqueous solution and an aqueous ammonia ($NH_3$) solution were simultaneously added dropwise in 500 ml of water. After adjusting to pH 7, the mixture was reacted at a liquid temperature of 30° C. for 30 minutes. The thus obtained precipitate was repeatedly subjected to inclination washing with ion-exchange water. After resistivity of the supernatant liquid reaches 50,000 Ω·cm or more, a precipitate (In/Sn co-precipitated hydroxide) was separated by filtration to obtain a co-precipitated indium tin hydroxide whose dry powder has a persimmon tone.

Figure 3:
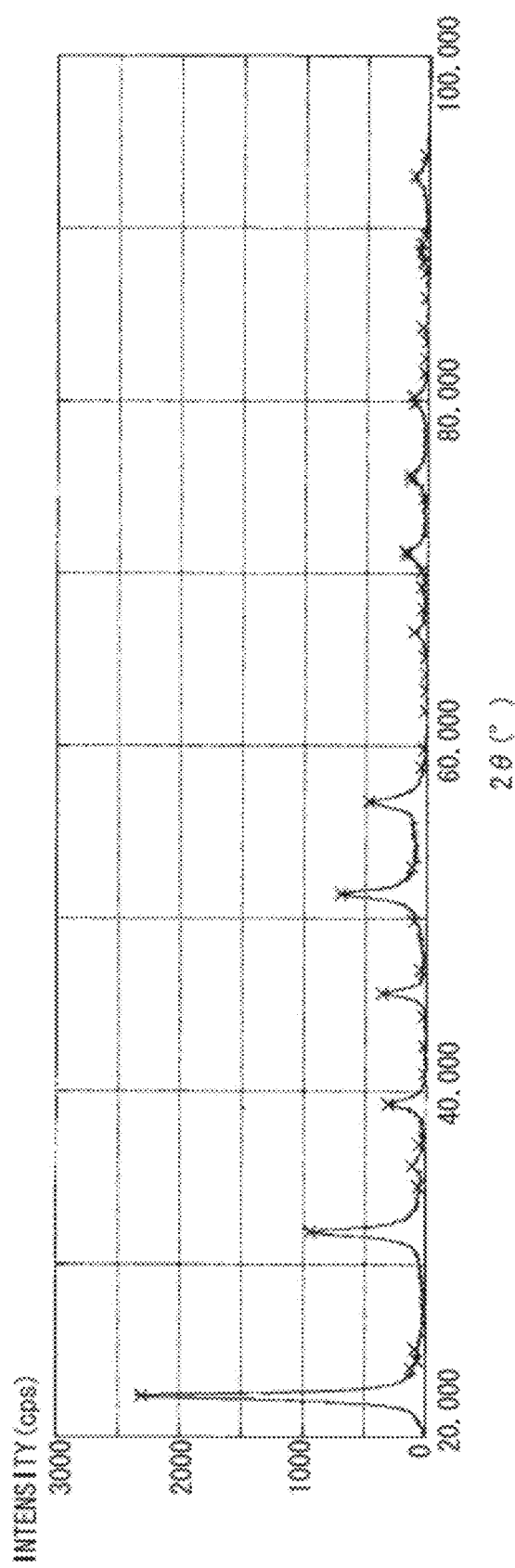
FIG. 3 is a graph showing an X-ray diffraction pattern of a co-precipitated indium tin hydroxide of No 1 in Table 1.
Figure 7:
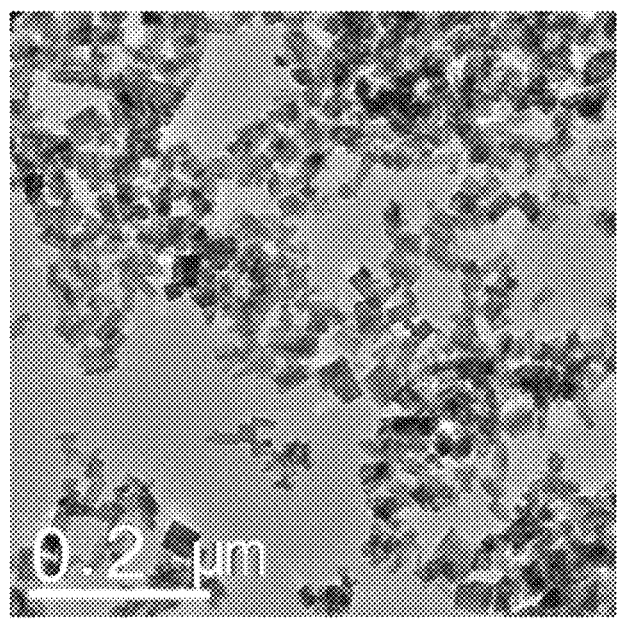
FIG. 7 is a TEM micrograph of a co-precipitated indium tin hydroxide of No. 1 in Table 1.

An X-ray diffraction pattern of the co-precipitated indium tin hydroxide is shown in FIG. 3. A TEM (transmission electron microscope) micrograph of the co-precipitated hydroxide powder is shown in FIG. 7. As is apparent from FIG. 7, the co-precipitated hydroxide powder has a clear crystal shape and thus the co-precipitated hydroxide powder has high crystallinity.

The solid-liquid separated indium tin hydroxide was dried overnight at 110° C., fired at 550° C. for 3 hours in atmospheric air, and then an aggregate was disentangled by grinding to obtain about 25 g of an ITO powder having a bright yellow color.

Lab values and a specific surface area of the obtained ITO powder are shown in Table 1.

The above-mentioned ITO powder (25 g) was impregnated by dipping in a surface treatment liquid prepared by mixing anhydrous ethanol with distilled water (in a mixing ratio of 95 parts by weight of ethanol:5 parts by weight of distilled water) and then placed in a glass petri dish and heated at 330° C. for 2 hours under a nitrogen gas atmosphere thereby performing a surface modification treatment. A color tone (L, a, b) and a BET value of the ITO powder are shown in Table 1. An X-ray diffraction pattern of the ITO powder is shown in FIG. 1. Furthermore, a partially enlarged view in the vicinity of a peak of the (222) plane is shown in FIG. 2. As shown in the drawing, it was confirmed that the ITO powder has a large relative intensity (about 3,000 cps), a half value width of a peak of 0.47° and high crystallinity. As shown in the X-ray diffraction pattern, a crystal system of the ITO powder is a cubic system.

[ITO Powder: Samples No. 2 to 3]

In the same manner as in Example 1, except that a liquid temperature of a mixed solution was adjusted to 10 and 60° C., an ITO power was obtained. The results of the ITO powder are shown in Table 1.

[ITO powder: Samples No. 4 to 5]

In the same manner as in Example 1, except that the pH of a mixed solution was adjusted to 4.5 and 8.5 by adjusting the addition amount of the aqueous alkali solution and that the liquid temperature was changed to 30° C., an ITO power was obtained. The results of the ITO powder are shown in Table 1.

[ITO Powder: Samples No. 6]

In the same manner as in Example 1, except that an aqueous ammonium hydrogen carbonate ($NH_4HCO_3$) solution was used as the aqueous alkali solution, an ITO power was obtained. Precipitation conditions, a color tone of a precipitate, a color tone and a specific surface area of the ITO powder, and the results of a surface treatment are shown in Table 1.

[ITO Powder: Comparative Sample No. 7]

In the same manner as in Example 1, except that the pH of a mixed solution was adjusted to 3.0 by adjusting an addition amount of an aqueous alkali solution, a co-precipitated indium tin hydroxide was obtained. A dry powder of the co-precipitated indium tin hydroxide had a slightly yellowish white color. In the same manner as in Example 1, the precipitate was treated to obtain an ITO powder. The results of the ITO powder are shown in Table 1.

[ITO Powder: Comparative Sample No. 8]

In the same manner as in Example 1, except that the pH of a mixed solution was adjusted to 9.5 by adjusting the addition amount of the aqueous alkali solution and that the liquid temperature was changed to 10° C., a co-precipitated indium tin hydroxide was obtained. The dry powder of the co-precipitated indium tin hydroxide had a slightly yellowish white color. In the same manner as in Example 1, the precipitate was treated to obtain an ITO powder. The results of the ITO powder are shown in Table 1.

[ITO Powder: Comparative Sample No. 9]

Figure 6:
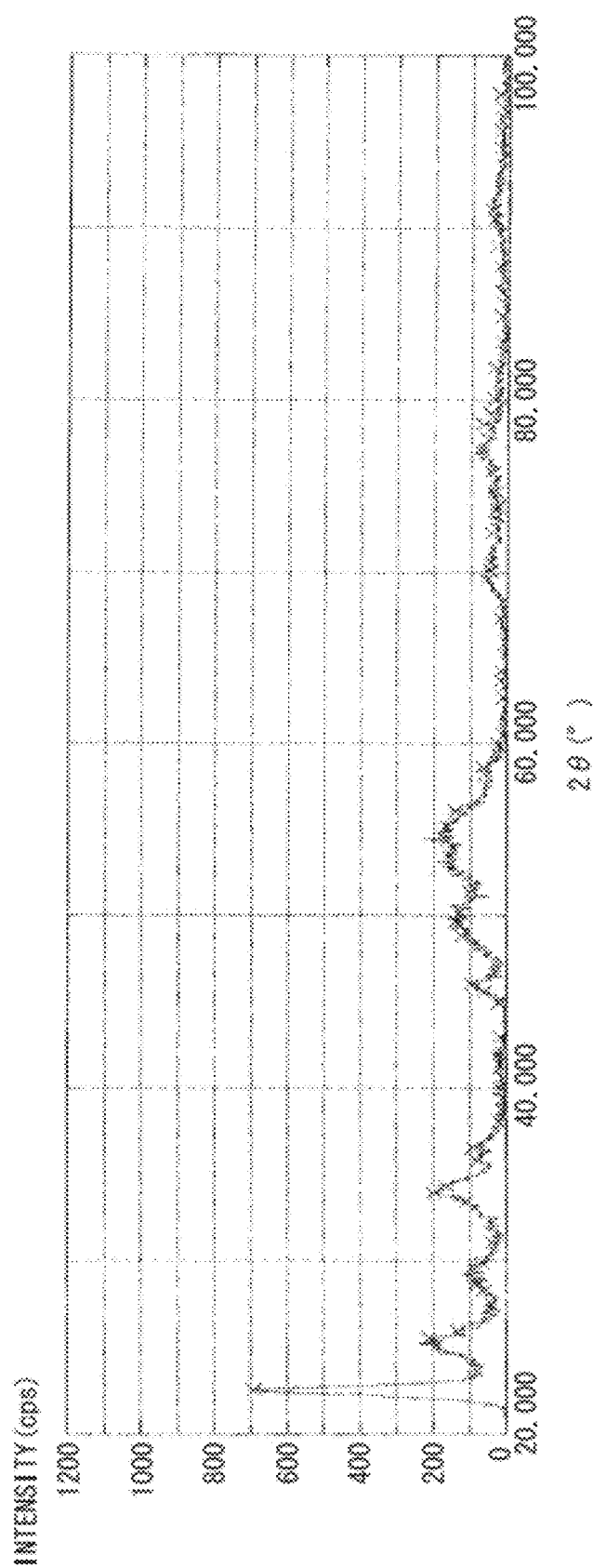
FIG. 6 is a graph showing an X-ray diffraction pattern of a co-precipitated indium tin hydroxide of No 9 in Table 1.
Figure 8:
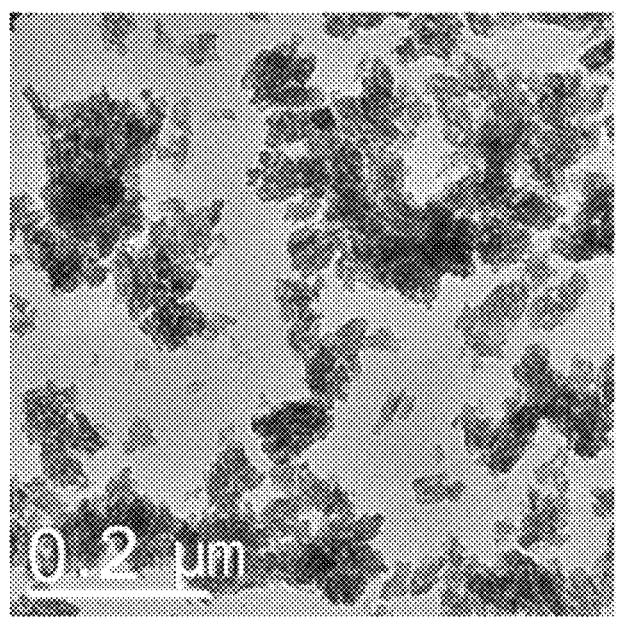
FIG. 8 is a TEM micrograph of a co-precipitated indium tin hydroxide of No. 9 in Table 1.

Using tin tetrachloride (aqueous $SnCl_4$ solution having a concentration of 55%) as a tin compound, 14.4 g of the aqueous $SnCl_4$ solution was mixed with 90 mL of an aqueous indium chloride ($InCl_3$) solution (containing 35 g of In metal) and the pH of a mixed aqueous solution was adjusted to 8 by adding 0.6 L of an aqueous alkali solution containing 190 g of ammonium hydrogen carbonate ($NH_4HCO_3$) to the mixed aqueous solution, and then the mixture was reacted at a liquid temperature of 30° C. for 30 minutes. The thus obtained precipitate was repeatedly subjected to inclination washing with ion-exchange water. After resistivity of the supernatant liquid reaches 50,000 Ω·cm or more, a co-precipitated indium tin hydroxide was separated by filtration. The obtained co-precipitated indium tin hydroxide had a white color. An X-ray diffraction pattern of the co-precipitated indium tin hydroxide is shown in FIG. 6. A TEM micrograph of the co-precipitated hydroxide powder is shown in FIG. 8. As is apparent from FIG. 8, the co-precipitated hydroxide powder has an unclear crystal shape when compared with the powder (No. 1 of Example A) in FIG. 7. The co-precipitated indium tin hydroxide was dried overnight at 110° C., fired at 550° C. for 3 hours in atmospheric air, and then an aggregate was disentangled by grinding to obtain about 44 g of an ITO powder. The above-mentioned ITO powder (25 g) was impregnated by dipping in a surface treatment liquid prepared by mixing anhydrous ethanol with distilled water (in a mixing ratio of 95 parts by weight of ethanol:5 parts by weight of distilled water) and then placed in a glass petri dish and heated at 330° C. for 2 hours under a nitrogen gas atmosphere.

Figure 5:
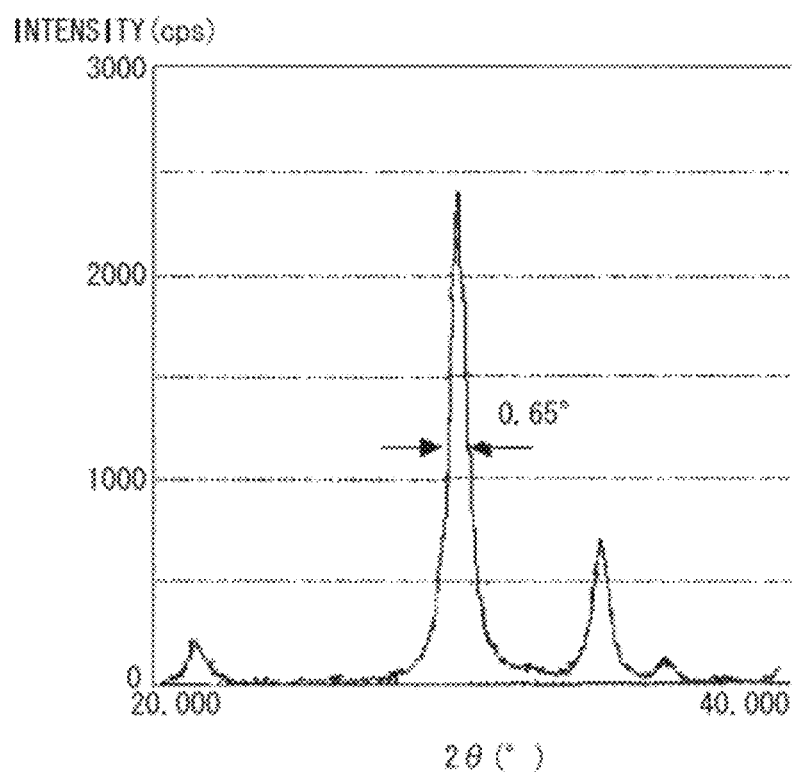
FIG. 5 is a partially enlarged view of FIG. 4.

Lab values and a specific surface area of the ITO powder are shown in Table 1. An X-ray diffraction pattern of the ITO powder is shown in FIG. 4. Furthermore, a partially enlarged view in the vicinity of a peak of the (222) plane is shown in FIG. 5. As shown in the drawing, it was confirmed that the ITO powder has a relative intensity of less than about 2,500 cps, a half value width of a peak of 0.65° and crystallinity lower than that of the ITO powder No. 1 of Example A.

As shown in Table 1, in any samples (No. 1 to No. 6) in preferred range of the present embodiment, a co-precipitated indium tin hydroxide having a bright yellow to persimmon tone is formed. When the pH deviates from the above range, as shown in Comparative Examples 1 to 3, a yellowish white precipitate is formed, and also the BET value decreases and the L value is more than 40 in the Lab colorimetric system of the powder after subjecting to a modification treatment. Furthermore, a problem such as whitening is likely to arise when formed into a coating film, resulting in poor heat-ray shielding properties. On the other hand, surface-modified ITO powders (No. 1 to No. 6) of the present embodiment have a specific surface area of 50 $m^2/g$ or more and most of powders are fine powders having a specific surface area of 55 $m^2/g$ or more. Therefore, it is possible to form a film having high visible light transmittance when a film is formed by mixing with a resin.

The surface-modified ITO powders (No. 1 to No. 6) of the present embodiment are powders having a navy blue color in which L<30, a<0, and b<0 in the Lab colorimetric system. Since a ratio [(a·b)/L] of the (a·b) value to the L value is 0.3 or more (0.8 or more in case of No. 2 to No. 6 in Table 1), excellent heat-ray shielding effect can be obtained when used as a heat-ray shielding material.

As shown in FIG. 1, FIG. 2 and FIG. 7, a co-precipitated hydroxide having a bright yellow color has high crystallinity of a hydroxide. It is possible to obtain an ITO powder having high specific surface area and high crystallinity by using the co-precipitated indium hydroxide having high crystallinity. A heat-ray shielding composition using the ITO powder can obtain high transparency and excellent sunlight shielding properties.

TABLE 1

| Sample | Example A | | | | | | Comparative Example A | | |
|---|---|---|---|---|---|---|---|---|---|
| | No. 1 | No. 2 | No. 3 | No. 4 | No. 5 | No. 6 | No. 7 | No. 8 | No. 9 |
| In raw material | $InCl_3$ | $InCl_3$ | $InCl_3$ | $InCl_3$ | $InCl_3$ | $InCl_3$ | $InCl_3$ | $InCl_3$ | $InCl_3$ |
| Sn raw material | $SnCl_2$ | $SnCl_2$ | $SnCl_2$ | $SnCl_2$ | $SnCl_2$ | $SnCl_2$ | $SnCl_2$ | $SnCl_2$ | $SnCl_4$ |
| Aqueous alkali solution | $NH_3$ | $NH_3$ | $NH_3$ | $NH_3$ | $NH_3$ | $NH_4HCO_3$ | $NH_3$ | $NH_3$ | $NH_4HCO_3$ |
| Mixed solution | | | | | | | | | |
| pH | 7 | 7 | 7 | 4.5 | 8.5 | 7 | 3.0 | 9.5 | 8 |
| Liquid temperature | 30° C. | 10° C. | 60° C. | 30° C. | 30° C. | 30° C. | 30° C. | 10° C. | 30° C. |
| Color tone of co-precipitate | Persimmon | Bright yellow | Bright yellow | Bright yellow | Persimmon | Bright yellow | Yellowish-white | Yellowish-white | White |
| L | 75.1 | 70.0 | 68.3 | 66.0 | 65.0 | 60.3 | 91 | 95 | 100 |
| a | -1.5 | 1.1 | 1.5 | -2.3 | 4.2 | 0.4 | 0.2 | 0.1 | 0.1 |
| b | 30.7 | 31.2 | 31.2 | 32.2 | 21.9 | 31.0 | R5.3 | 2.1 | -0.2 |
| Color tone of ITO powder fired in atmospheric air | Bright yellow | Bright yellow | Bright yellow | Bright yellow | Bright yellow | Bright yellow | Olive-green | Olive-green | Olive-green |
| L | 60.1 | 58.3 | 56.0 | 62.3 | 67.1 | 57.2 | 82.5 | 77.8 | 77.8 |
| a | 0.4 | 1.1 | -0.8 | -1.2 | 1.2 | 2.1 | -7.1 | -7.4 | -8.7 |
| b | 30.8 | 31.5 | 29.5 | 31.2 | 30.8 | 29.7 | 16.3 | 17.8 | 27.9 |
| BET value of ITO powder ($m^2/g$) | 71 | 85 | 60 | 72 | 72 | 68 | 48 | 45 | 45 |
| ITO powder after modification treatment | Navy blue | Navy blue | Navy blue | Navy blue | Navy blue | Navy blue | Light blue | Light blue | Light blue |
| L | 21.3 | 29.1 | 27.4 | 29.6 | 26.5 | 27.9 | 53.8 | 56.5 | 44.5 |
| a | -2.8 | -2.1 | -2.2 | -4.2 | -3.8 | -3.3 | -4.0 | -5.3 | -3.4 |
| b | -2.3 | -12.0 | -11.0 | -7.2 | -6.1 | -7.8 | -14.1 | -14.3 | -1.0 |
| BET value of ITO powder after modification treatment ($m^2/g$) | 55 | 71 | 50 | 55 | 56 | 62 | 29 | 27 | 35 |

(Note):
$SnCl_2$ is $SnCl_2 \cdot 2H_2O$, co-precipitate is co-precipitated indium tin hydroxide, and color tone of a co-precipitate is a color tone of a dry powder, and yellowish-white is slightly yellowish white color.

[Test of Heat-Ray Shielding Properties or the Like]

With respect to dispersion solutions of ITO powders (No. 1, No. 6, No. 7 and No. 8) shown in Table 1, a visible light transmittance (% Tv), a sunlight transmittance (% Ts), a haze and a reflective yellowness index (YI) were measured. The details are shown below (Example B and Comparative Example B). The visible light transmittance (% Tv), sunlight transmittance (% Ts), haze and reflective yellowness index (YI) were measured by the following methods.

Example B

ITO powders (20 g) of samples No. 1 and No. 6 shown in Table 1 were dipped and dispersed in a mixed solution of distilled water (0.020 g), triethylene glycol-di-2-ethylhexanoate [3G] (23.8 g), anhydrous ethanol (2.1 g), phosphoric acid polyester (1.0 g), 2-ethylhexanoic acid (2.0 g) and 2,4-pentanedion (0.5 g).

[Measurement of Spectral Characteristics]

The thus prepared dispersion solution was diluted with triethylene glycol-di-2-ethylhexanoate until the amount of ITO powder reaches 0.7% by mass. With respect to the sample No. 6, the amount of the ITO powder was adjusted to 0.7% by weight, 0.9% by weight, 1.2% by weight and 1.4% by weight. The diluted solution was charged in a glass cell having an optical path length of 1 mm Using a self-registering spectrophotometer (U-4000, manufactured by Hitachi, Ltd.), a visible light transmittance (% Tv) at 380 nm to 780 nm and a sunlight transmittance (% Ts) at 300 nm to 2,100 nm were measured at normal temperature in accordance with the standard (JIS R 3216-1998 (equivalent to ISO9050 1990)). The results are shown in Table 2.

[Haze]

Using the dispersion solution diluted in the same manner as in case of the sample for the measurement of spectral characteristics as a sample, the sample was charged in a glass cell having an optical path length of 1 mm Using a haze computer (HZ-2, manufactured by SUGA TEST INSTRUMENTS CO., LTD.), a haze was measured at normal temperature in accordance with the standard (JIS K 7136 (equivalent to ISO 14782 1999)). The results are shown in Table 2.

[Reflective Yellowness Index (YI)]

Using the dispersion solution diluted in the same manner as in case of the sample for the measurement of spectral characteristics as a sample, 6.73 g of the diluted solution sample was charged in a liquid cell for reflection (No. 15). Using a color computer (SM-T, manufactured by SUGA TEST INSTRUMENTS CO., LTD.), a reflective yellowness index (YI) was measured from a reflectance of visible light (380 nm to 780 nm) in a state of being covered with a dark box for shielding outdoor daylight in accordance with the standard (JIS K 7105). The results are shown in Table 2.

The measurement was performed by the following equation:

$$YI = 100(1.28X - 1.06Z)/Y$$

where X, Y and Z are tristimulus values (XYZ colorimetric system) of test samples in standard illuminant C. The standard illuminant C is model illuminant obtained by approximation of average daylight with a correlated color temperature of 6774° K using a CIE (Comission Internationale de l'Eclairage) standard light source formed by a tungsten light source through a filter.

Comparative Example B

ITO powders (20 g) of samples No. 7 and No. 8 shown in Table 1 were dispersed in the mixed solution similar to Example A. With respect to the dispersion solution, the visible light transmittance (% Tv), sunlight transmittance (% Ts), haze and reflective yellowness index (YI) were measured. The results are shown in Table 2.

As shown in Table 2, since the heat-ray shielding composition of the present embodiment composed of a dispersion solution of ITO powders of samples No. 1 and No. 6 has high visible light transmittance compared with samples No. 7 and No. 8 of Comparative Example B and satisfactory crystallinity of the ITO powder, sunlight transmittance is low and heat-ray shielding properties are remarkably improved regardless of high visible light transmittance. Furthermore, since samples No. 1 and No. 6 of the present embodiment also have low haze value, even if the concentration of ITO in the dispersion solution is increased by two times, the haze value is 1% or less. Furthermore, the reflective yellowness index (YI) has a small absolute value, and thus a less hazy film can be formed.

On the other hand, in case of using ITO powders of samples Nos. 7 and 8, the visible light transmittance (% Tv) is low and the sunlight transmittance (% Ts) is high because of low BET value. In addition, the haze is drastically high.

TABLE 2

|  | Example B | | | | | Comparative Example B | |
| --- | --- | --- | --- | --- | --- | --- | --- |
|  | A1 | A2 | A3 | A4 | A5 | B1 | B2 |
| Kind of powder | No. 1 | No. 6 | No. 6 | No. 6 | No. 6 | No. 7 | No. 8 |
| Concentration of ITO in dispersion solution (%) | 0.7 | 0.7 | 0.9 | 1.2 | 1.4 | 0.7 | 0.7 |
| % Tv | 88.5 | 90.9 | 88.4 | 85.0 | 82.8 | 84.1 | 84.0 |
| % Ts | 57.5 | 60.0 | 56.0 | 51.4 | 48.6 | 65.0 | 64.4 |
| Haze (%) | 0.35 | 0.31 | 0.37 | 0.48 | 0.54 | 5.01 | 1.01 |
| YI | −17.5 | −17.1 | −20.2 | −24.2 | −26.4 | — | −30.1 |

(Note):
Each of Nos. 1, 6, 7 and 8 denotes the ITO powder of the same number in Table 1.
Since sample No. 7 has high haze, the YI value was not measured.

The invention claimed is:

1. A heat-ray shielding composition comprising an indium tin oxide powder which has a BET specific surface area of 40 m$^2$/g or more and a navy blue or cobalt blue (L=30 or less, a<0, b<0 in the Lab colorimetric system) tone, wherein a peak of the (222) plane in an X-ray diffraction chart has a relative intensity of about 2,800 to 5,000 cps, and has half value width of a peak of about 0.3 to 0.5° in the indium tin oxide powder.

2. The heat-ray shielding composition according to claim 1, the heat-ray shielding composition further comprising a dispersion solvent,
wherein, the heat-ray shielding composition has a sunlight transmittance of 60% or less, a visible light transmittance of 85% or more, and a haze of 0.5% or less; as determined by:
preparing a cell an optical path length of 1 mm comprising the heat-ray shielding composition containing the indium tin oxide powder in a concentration of 0.7% by weight to 1.2% by weight; and measuring the sunlight transmittance, the visible light transmittance, and the haze through the cell.

3. The heat-ray shielding composition according to claim 1, wherein the indium tin oxide powder contained in the heat-ray shielding composition is an indium tin oxide powder which is surface-modified by firing indium tin hydroxide having a bright yellow to persimmon (reddish brown or orange-red) tone, or an indium tin oxide powder which is surface-modified by firing indium tin oxide having a bright yellow to persimmon (reddish brown or orange-red) tone.

4. The heat-ray shielding composition according to claim 2, wherein the indium tin oxide powder contained in the heat-ray shielding composition is an indium tin oxide powder which is surface-modified by firing indium tin hydroxide having a bright yellow to persimmon (reddish brown or orange-red) tone, or an indium tin oxide powder which is surface-modified by firing indium tin oxide having a bright yellow to persimmon (reddish brown or orange-red) tone.

5. The heat-ray shielding composition according to claim 1, wherein a ratio [(a·b)/L] of the (a·b) value to the L value is 0.3 or more.

6. A method for producing a heat-ray shielding composition, which comprises the steps of:
mixing an indium compound and a divalent tin compound,
co-precipitating an indium tin hydroxide in a presence of alkali and in a solution having a pH of 4.0 to 9.3 and a liquid temperature of 5° C. or higher;
drying and firing the indium tin hydroxide to obtain a surface-modified indium tin oxide powder; and
dispersing the surface-modified indium tin oxide powder in a solvent, and then mixing the dispersion solution with a resin,
wherein, a dry powder of the indium tin hydroxide exhibits a bright yellow to persimmon (reddish brown or orange-red) color,
the pH is adjusted within the range of 4.0 to 9.3 by using a mixed aqueous solution of the indium compound and the divalent tin compound and simultaneously adding dropwise the mixed aqueous solution and an aqueous alkali solution in an aqueous, and
a peak of the (222) plane in an X-ray diffraction chart has a relative intensity of about 2,800 to 5,000 cps, and has half value width of a peak of about 0.3 to 0.5° in the surface-modified indium tin oxide powder.

7. The method for producing a heat-ray shielding composition according to claim 6, wherein
the surface modification is performed by heating/firing which is performed simultaneously with or after drying of bright yellow to persimmon (reddish brown or orange-red) indium tin hydroxide under a nitrogen atmosphere, or under an atmosphere of nitrogen containing any one kind selected from the group consisting of steam, alcohol and ammonia, and
the surface-modified indium tin oxide powder has a navy blue or cobalt blue tone and a BET specific surface area of 40 m$^2$/g or more.

8. The method for producing a heat-ray shielding composition according to claim 4, which performs, in the step of obtaining the surface-modified indium tin oxide powder, a surface modification treatment of any one of the following (I), (II) and (III):
(I) a co-precipitate of indium tin hydroxide is dried and fired by heating at 250 to 800° C. for 30 minutes to 6 hours under a nitrogen atmosphere, a nitrogen atmosphere containing an alcohol, or a nitrogen atmosphere containing ammonia,
(II) a co-precipitate of indium tin hydroxide is dried overnight at 100° C. to 200° C. under an air atmosphere, and then fired by heating at 250 to 800° C. for 30 minutes to 6 hours under a nitrogen atmosphere, a nitrogen atmosphere containing an alcohol, or a nitrogen atmosphere containing ammonia; and
(III) a co-precipitate of indium tin hydroxide is dried and fired under an air atmosphere, and then heat-treated at 250 to 800° C. for 30 minutes to 6 hours under a nitrogen atmosphere, a nitrogen atmosphere containing an alcohol, or a nitrogen atmosphere containing ammonia.

9. The method for producing a heat-ray shielding composition according to claim 5, which performs, in the step of obtaining the surface-modified indium tin oxide powder, a surface modification treatment of any one of the following (I), (II) and (III):

(I) a co-precipitate of indium tin hydroxide is dried and fired by heating at 250 to 800° C. for 30 minutes to 6 hours under a nitrogen atmosphere, a nitrogen atmosphere containing an alcohol, or a nitrogen atmosphere containing ammonia, (II) a co-precipitate of indium tin hydroxide is dried overnight at 100° C. to 200° C. under an air atmosphere, and then fired by heating at 250 to 800° C. for 30 minutes to 6 hours under a nitrogen atmosphere, a nitrogen atmosphere containing an alcohol, or a nitrogen atmosphere containing ammonia; and (III) a co-precipitate of indium tin hydroxide is dried and fired under an air atmosphere, and then heat-treated at 250 to 800° C. for 30 minutes to 6 hours under a nitrogen atmosphere, a nitrogen atmosphere containing an alcohol, or a nitrogen atmosphere containing ammonia.

* * * * *